US008446057B2

(12) United States Patent
Kelsey et al.

(10) Patent No.: US 8,446,057 B2
(45) Date of Patent: May 21, 2013

(54) COOLING SYSTEM, A MOTOR HANDLING SYSTEM, AND A METHOD OF POSITIONING A MOTOR IN A COOLING SYSTEM

(75) Inventors: Richard Kelsey, Claremore, OK (US); Micheal Shroyer, Skiatook, OK (US)

(73) Assignee: Harsco Corporation, Camp Hill, PA (US)

( * ) Notice: Subject to any disclaimer, the term of this patent is extended or adjusted under 35 U.S.C. 154(b) by 284 days.

(21) Appl. No.: 13/011,561

(22) Filed: Jan. 21, 2011

(65) Prior Publication Data

US 2012/0186777 A1 Jul. 26, 2012

(51) Int. Cl.
*H02K 9/00* (2006.01)
(52) U.S. Cl.
USPC .............................. 310/58; 310/52
(58) Field of Classification Search
USPC ............... 310/52–59; 165/47; 414/749, 800
See application file for complete search history.

(56) References Cited

U.S. PATENT DOCUMENTS

| 2,659,184 | A |   | 11/1953 | Mead et al. |         |
|-----------|---|---|---------|-------------|---------|
| 3,866,108 | A |   | 2/1975  | Yannone et al. |      |
| 3,866,867 | A |   | 2/1975  | LaRocca     |         |
| 4,036,152 | A | * | 7/1977  | Bright      | 110/191 |
| 4,492,533 | A | * | 1/1985  | Tsuge       | 417/372 |
| 4,539,737 | A |   | 9/1985  | Kerpers et al. |      |
| 4,585,398 | A | * | 4/1986  | Drake       | 417/367 |
| 4,589,818 | A | * | 5/1986  | Brown et al. | 414/744.3 |
| 4,902,226 | A | * | 2/1990  | Elliott et al. | 433/104 |
| 4,976,098 | A | * | 12/1990 | Meyer et al. | 57/308 |
| 4,991,315 | A | * | 2/1991  | Falck       | 34/217  |
| 5,236,625 | A | * | 8/1993  | Bardo et al. | 261/24 |
| 5,240,648 | A | * | 8/1993  | Gill et al. | 261/30 |

FOREIGN PATENT DOCUMENTS

| AT | 129408 B | 8/1932 |
|----|----------|--------|
| GB | 2112511 A | 7/1983 |

OTHER PUBLICATIONS

Model Z Brochure, Harsco Industrial, Air-X-Changers, P. O. Box 1894, Tulsa, OK 74101, Dec. 4, 2009.
Model W Brochure, Harsco Industrial, Air-X-Changers, P. O. Box 1894, Tulsa, OK 74101, Dec. 4, 2009.
Model VI Brochure, Harsco Industrial, Air-X-Changers, P. O. Box 1894, Tulsa, OK 74101, Dec. 15, 2009.
Model H Brochure, Harsco Industrial, Air-X-Changers, P. O. Box 1894, Tulsa, OK 74101, Dec. 15, 2009.
Model F Brochure, Harsco Industrial, Air-X-Changers, P. O. Box 1894, Tulsa, OK 74101, Dec. 4, 2009.
Model EH Brochure, Harsco Industrial, Air-X-Changers, P. O. Box 1894, Tulsa, OK 74101, Dec. 15, 2009.

* cited by examiner

*Primary Examiner* — Thanh Lam
(74) *Attorney, Agent, or Firm* — McNees Wallace & Nurick LLC

(57) ABSTRACT

A cooling system, a motor handling system, and a method of positioning a motor in a cooling system are disclosed. The motor handling system includes a suspension feature configured to engage a support member, the support member positioned partially below a cooler. The motor handling system permits positioning of a motor in a first position and re-positioning of the motor to a second position. The cooling system includes a cooler, a support member positioned partially below the cooler, and a motor handling system. The method of positioning includes engaging a support member of a cooling system with a suspension feature, positioning the motor at a first position, and re-positioning the motor at a second position.

20 Claims, 4 Drawing Sheets

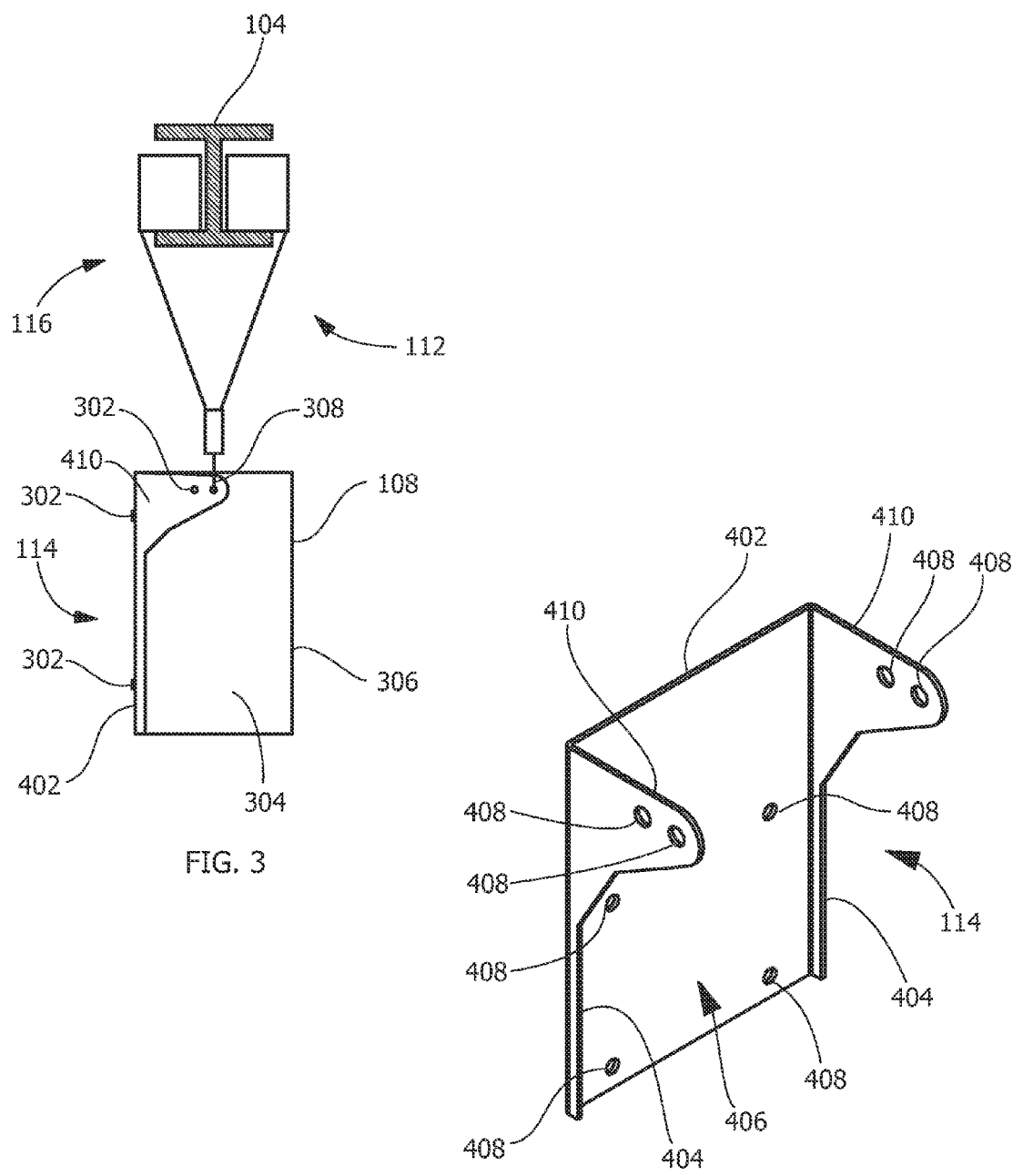

_US 8,446,057 B2_

COOLING SYSTEM, A MOTOR HANDLING SYSTEM, AND A METHOD OF POSITIONING A MOTOR IN A COOLING SYSTEM

FIELD OF THE INVENTION

The present invention is directed to systems and methods for positioning motors. More particularly, the present invention is directed to systems and methods for positioning motors within cooling systems by a motor handling system.

BACKGROUND OF THE INVENTION

Electric motors can be heavy, bulky, and difficult to move. Periodically, electric motors are repaired and/or replaced during normal operation. Likewise, components proximal to electric motors can be repaired and/or replaced during normal operation. Known systems and methods of repairing and replacing electric motors and/or components proximal to electric motors can involve removing all or a portion of the electric motor in order to repair or replace the desired components. With large systems, this can be difficult and/or expensive.

A system can include an electric motor positioned on a skid, such as a heavy duty oil-field type skid, checkered floor plates for stability, four main runners for engagement with a skid loader, and leveling jack screws for maintaining a substantially level orientation. The skid can be concrete-filled for additional weight and safety and can include drains or other features. The skid can be a substantial weight, for example, about 125,000 pounds, in order to support components having a substantial weight, for example, the motor, other components, and/or a cooler having a weight of about 20,000 pounds.

Such a system suffers from several drawbacks. For example, such a system results in difficult repair or replacement due to the substantial weight of the skid. A large amount of force is used for pulling the skid out to repair or replace components such as an electric motor. In addition, components such as the electric motor positioned on the skid can be difficult to maintain at a level position. Although features for leveling the skid can be included, the weight of the skid can result in difficulties in making such adjustments.

A cooling system, a motor handling system, and a method of positioning a motor in a cooling system that do not suffer from the above drawbacks would be desirable in the art.

BRIEF DESCRIPTION OF THE INVENTION

In an exemplary embodiment, a cooling system includes a cooler, a support member positioned partially below the cooler, and a motor handling system having a suspension feature, the suspension feature being configured to engage the support member. The motor handling system permits positioning of a motor at a first position and re-positioning of the motor at a second position.

In another exemplary embodiment, a method of positioning a motor includes engaging a support member of a cooling system with a suspension feature, the support member being partially positioned below a cooler in the cooling system, securing the suspension feature to the motor, positioning the motor at a first position, and re-positioning the motor at a second position.

In another exemplary embodiment, a motor handling system includes a suspension feature configured to engage a support member, the support member being positioned partially below a cooler. The suspension feature is configured to be secured to a motor. The motor handling system permits positioning of the motor in a first position and re-positioning of the motor to a second position.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 shows an axial view of an exemplary motor handling system engaged to a support member in a cooling system according to an embodiment of the disclosure.

FIG. 4 shows a mounting bracket for an exemplary motor handling system according to an embodiment of the disclosure.

Wherever possible, the same reference numbers will be used throughout the drawings to represent the same parts.

DETAILED DESCRIPTION OF THE INVENTION

Provided is a cooling system, a motor handling system, and a method of positioning a motor in a cooling system. Embodiments of the disclosure permit positioning of electric motors, permit easier repair or replacement of electric motors and/or other components, permit a reduction of costs associated with using greater forces for movement of electric motors and/or other components, permit other suitable benefits, and combinations thereof.

Figure 1:
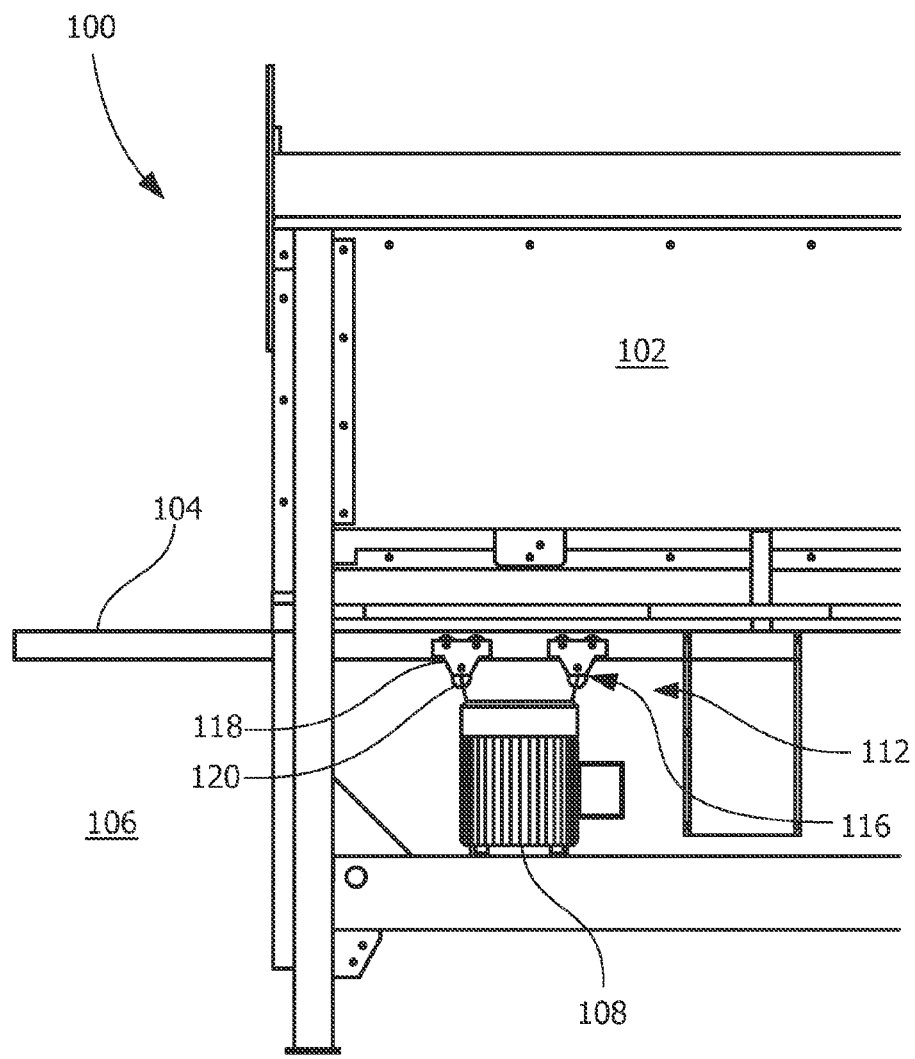
FIG. 1 shows a side view of an exemplary cooling system with a motor positioned below a cooler according to an embodiment of the disclosure.
Figure 2:
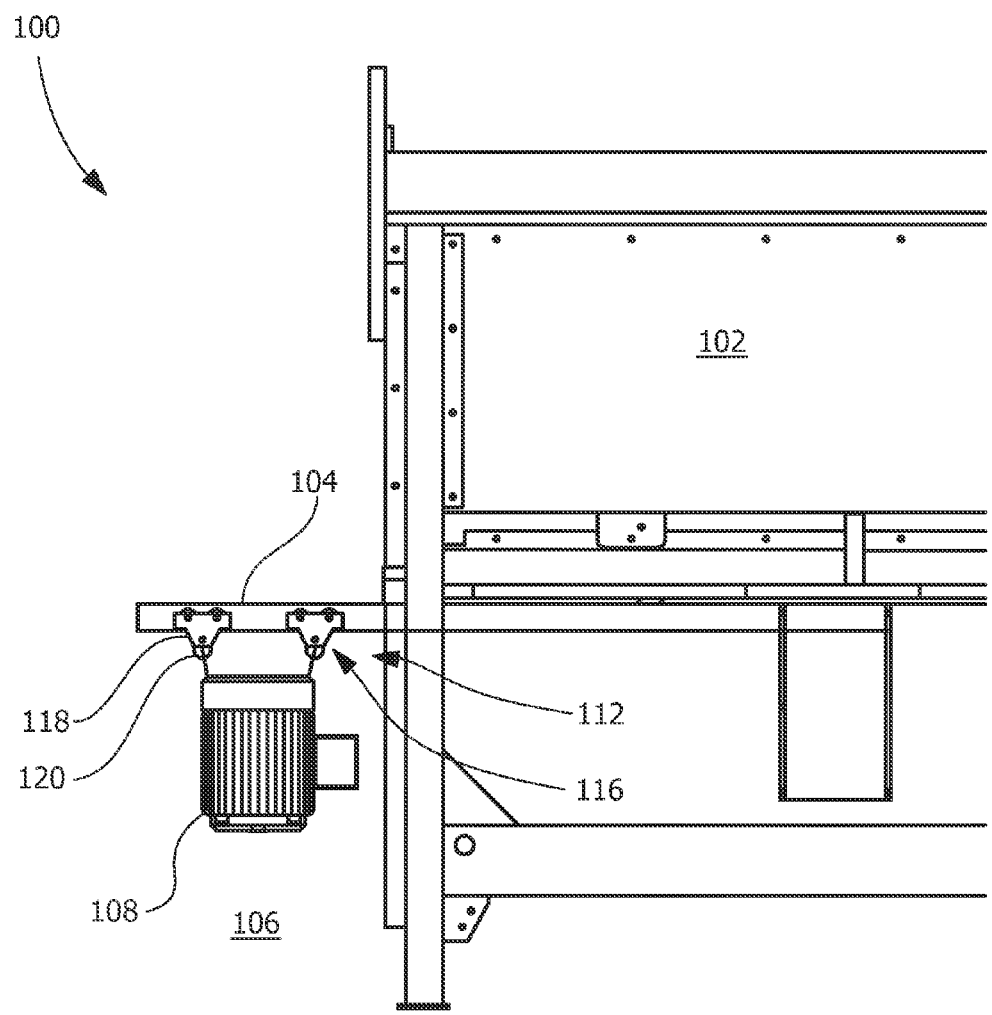
FIG. 2 shows a side view of the exemplary embodiment shown in FIG. 1 with the motor positioned in a region beyond the cooler.

Referring to FIGS. 1 and 2, according to an exemplary embodiment, a cooling system 100 includes a cooler 102, a support member 104 extending from below the cooler 102 to a region 106 beyond the cooler 102, an electric motor 108, and a motor handling system 112. In FIG. 1, the electric motor 108 is positioned in a first position, for example, below the cooler 102. In FIG. 2, the electric motor 108 is positioned in a second position, for example, within the region 106 beyond the cooler 102. According to an exemplary method of positioning the electric motor 108, a suspension feature 116 engages the support member 104 and the electric motor 108 is selectively positioned and repositioned between the first position (see FIG. 1) and the second position (see FIG. 2).

The motor handling system 112 positions and re-positions the electric motor 108. In one embodiment, the motor handling system 112 includes the suspension feature 116 configured to be engaged/secured to the support member 104 and the electric motor 108 and any other suitable features. Other suitable features include, but are not limited to, one or more trolleys 118, one or more turnbuckles 120, a mounting bracket 114, cables 308, or other suitable features for supporting and adjusting the position of the electric motor 108.

The suspension feature 116 is configured to engage the support member 104, thereby permitting the motor handling system 112 to reposition the electric motor 108. The suspension feature 116 is one or more components capable of being repositioned along the support member 104, thereby permitting repositioning of the electric motor 108. In one embodiment, the suspension feature 116 includes one or more trolleys 118 positioned within the support member 104. Additionally or alternatively, the suspension feature 116 includes a chain (not shown) positioned along the support member 104, one or more pulleys (not shown) positioned along the support member 104, a sequence of wheels (not shown) secured to the support member 104 defining a path for the movement of the motor handling system 112, any other suitable positioning mechanism, or combinations thereof.

In one embodiment, the suspension feature 116 includes one or more turnbuckles 120 positioned between the support member 104 and a mounting bracket 114 (see FIG. 3). The turnbuckles 120 permit adjustment of the orientation of the motor handling system 112, leveling of the motor handling system 112, increased weight distribution by the motor handling system 112, and/or increased ability to engage and disengage the motor handling system 112 from the support member 104.

In one embodiment, the cooler 102 is a bolt-together or welded horizontal cooler designed for high-horsepower applications allowing flexible positioning. In this embodiment, the cooler 102 is part of a cooling system 100. In one embodiment, the cooler 102 includes one or more fans (not shown). The fans have diameters from about 48 inches to about 204 inches, are configured to provide forced draft or induced draft, and are configured to provide a predetermined air flow. In one embodiment, the one or more fans include a low noise emission fan. Additionally or alternatively, in further embodiments, the cooling system 100 includes a large air intake profile, is capable of being positioned on subcolumns or skids, includes extendable subcolumns, is capable of positioning with pipe-rack mounts, is capable of field assembly, includes drive maintenance capability by having a predetermined fan deck clearance, includes warm air recirculation to control process outlet temperature in cold weather climates, includes multi-speed drives for fans or auto-variable fans for temperature control, includes manual or automated louvers downstream of the cooling section to control air flow for temperature control, includes manual or automated auxiliary lovers located upstream of the cooling section to provide additional protection in cold weather environments, includes an independent or integral (with shutters) hailguard over cooling section coils to protect the cooling section, includes insect and/or lint screens over air intake to reduce or eliminate external fouling of the cooling section, includes other suitable features, or combinations thereof. In another embodiment, the cooler is arranged such that the fan is installed in a vertical orientation and the motor axis is horizontal.

In one embodiment, the cooler 102 is a skid-mounted horizontal cooler capable of use with a variety of applications. In this embodiment, the cooler 102 is part of the cooling system 100. In one embodiment, the cooler 102 includes one or more fans (not shown). The fans have diameters from about 24 inches to about 144 inches, are configured to provide forced draft or induced draft, are configured to provide a predetermined air flow. In one embodiment, the one or more fans include a low noise emission fan. Additionally or alternatively, in further embodiments, the cooling system 100 includes multi-speed drives for fans or auto-variable fans for temperature control, includes manual or automated louvers downstream of the cooling section to control air flow for temperature control, includes manual or automated auxiliary lovers located upstream of the cooling section to provide additional protection in cold weather environments, includes an independent or integral (with shutters) hailguard over cooling section coils to protect the cooling section, includes insect and/or lint screens over air intake to reduce or eliminate external fouling of the cooling section, includes other suitable features, or combinations thereof.

As shown in FIGS. 1 and 2, in one embodiment, the support member 104 extends from below the cooler 102 to the region 106 beyond the cooler 102. The support member 104 is positioned substantially perpendicular to the direction of gravity. The support member 104 is a rigid member capable of supporting loads of a predetermined weight range, for example between about 100 pounds and about 1,000 pounds without resulting in structural fatigue and/or failure. For example, in one embodiment, the support member 104 is a steel I-beam. The support member 104 attaches to primary structural components. In one embodiment, the support member 104 is removable for storage.

The region 106 beyond the cooler 102 is configured for access, thereby permitting the electric motor 108 to be repaired or replaced. For example, the region 106 permits access by a forklift, is beyond the footprint of the cooling system 100, is positioned along a gravel surface or paved surface proximal to the cooling system 100, is larger than the electric motor 108, or combinations thereof. The region 106 can include other suitable features including, but not limited to, having drainage and/or having an enclosure such as a roof, walls, and/or fencing. The region 106 also permits motor access to jib crane, over-head crane, and/or other lifting or conveyance device.

The electric motor 108 is any suitable electric motor. In one embodiment, the electric motor 108 has a weight between about 100 pounds and about 1500 pounds or a weight of about 100 pounds, about 750 pounds, or about 1500 pounds. In one embodiment, the electric motor 108 includes features (not shown) for engaging the motor handling system 112, for example, fasteners, clamps, pulleys, loops, or other suitable engagement features permitting the electric motor 108 to be positioned and re-positioned by manual or driven force being applied to the electric motor 108 by one or more cables, one or more ropes, a forklift, manual labor, or other suitable techniques. In one embodiment, the electric motor 108 is devoid of features for engaging the motor handling system 112 directly. In this embodiment, the mounting bracket 114 is secured to the electric motor 108 and the mounting bracket 114 includes features (not shown) for engaging the motor handling system 112.

The mounting bracket 114 is any suitable support structure capable of securing the electric motor 108 to the motor handling system 112. Referring to FIGS. 3-6, in one embodiment, the mounting bracket 114 is secured to the electric motor 108 by one or more fasteners 302. The fasteners 302 are any suitable fasteners. Suitable fasteners include, but are not limited to, bolts, screws, welds, latches, other securing features, or combinations thereof. In one embodiment, the mounting bracket 114 permits movement of the electric motor 108 through movement of the motor handling system 112. For example, in one embodiment, the mounting bracket 114 includes fasteners, clamps, pulleys, loops, or other suitable engagement features permitting the electric motor 108 to be positioned by manual or driven force being applied to the mounting bracket 114 by one or more cables, one or more ropes, a forklift, manual labor, or other suitable techniques. As shown in FIGS. 3 and 4, multiple connection points, for example, fasteners 302 and/or apertures 408, on bracket 114 allow for lifting from motor handling system via jib crane or other lifting device for motor service.

Referring to FIG. 4, in one embodiment, the mounting bracket 114 includes a planar portion 402 having side portions 404 forming a profile 406 configured to abut the electric motor 108, for example, on at least a portion of three surfaces of the electric motor 108. The planar portion 402 is arranged to receive the fasteners 302, for example, by including apertures 408 for the fasteners 302. The mounting bracket 114 further includes extension portions 410 positioned perpendicular to the planar portion 402 and parallel to the side portions 404. The extension portions 410 are arranged for the engaging fasteners 302 (see FIG. 3) or a cable 308 (see FIG. 3) extending from the suspension feature 116.

Referring to FIG. 3, in one embodiment, the mounting bracket 114 is positioned with the planar portion 402 oriented in a direction substantially consistent with the direction of gravity. The mounting bracket 114 is secured to the electric motor 108 with fasteners 302 positioned on the planar portion 402 and at least one fasteners 302 positioned on each extension portion 410. In this embodiment, the extension portions 410 are configured to engage the suspension feature 116 such that the electric motor 108 is positioned substantially centered in relation to the support member 104. This embodiment permits two side surfaces 304 of the electric motor 108 to be substantially exposed and an opposing surface 306 of the electric motor 108 to be completely exposed, thereby preventing undesirable interference with operation of the electric motor 108 based upon covering of the surfaces.

Figure 5:
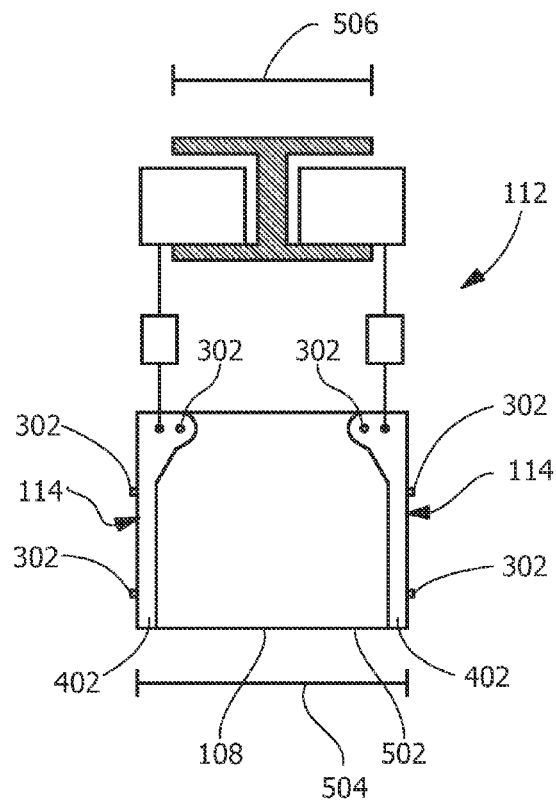
FIG. 5 shows an axial view of an exemplary motor handling system engaged to a support member in a cooling system according to an embodiment of the disclosure.
Figure 6:
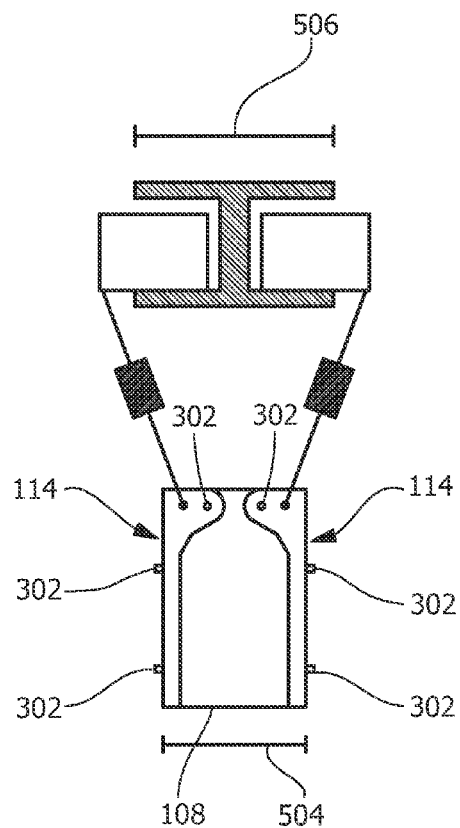
FIG. 6 shows an axial view of an exemplary motor handling system engaged to a support member in a cooling system according to an embodiment of the disclosure.

Referring to FIG. 5, in one embodiment, a first and a second mounting bracket 114 are positioned such that the planar portions 402 of each are oriented in a direction substantially consistent with the direction of gravity. In this embodiment, use of the multiple mounting brackets 114 permits the motor handling system 112 to be used with motors having a variety of dimensions. For example, use of two mounting brackets 114 permits the same motor handling system 112 to be used with a larger motor 502 having a dimension 504 extending beyond the width 506 of the support member 104 as shown in FIG. 5 and a smaller motor 602 having a dimension 504 that does not extend beyond the width 506 of the support member 104 as shown in FIG. 6.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cooling system, comprising:
   a cooler;
   a support member positioned partially below the cooler; and
   a motor handling system having a suspension feature, the suspension feature being configured to engage the support member;
   wherein the motor handling system permits positioning of a motor at a first position and re-positioning of the motor at a second position.

2. The cooling system of claim 1, wherein the first position is below the cooler.

3. The cooling system of claim 1, wherein the second position is within a region beyond the cooler.

4. The cooling system of claim 1, wherein the support member extends from below the cooler to a region beyond the cooler.

5. The cooling system of claim 1, further comprising a mounting bracket secured to the motor and the suspension feature.

6. The cooling system of claim 5, wherein the mounting bracket is configured to cover at least portions of a first surface, a second surface, and a third surface of the motor.

7. The cooling system of claim 6, wherein the mounting bracket is configured to expose at least a portion of the first surface and the second surface and to completely expose a fourth surface.

8. The cooling system of claim 5, wherein the suspension feature includes one or more turnbuckles positioned along one or more cables extending from the support member to the mounting bracket.

9. The cooling system of claim 1, wherein the suspension feature includes one or more trolleys positioned within the support member.

10. The cooling system of claim 1, wherein the support member is a steel I-beam.

11. The cooling system of claim 1, wherein the support member and trolley system are removable.

12. A method of positioning a motor, comprising:
   engaging a support member of a cooling system with a suspension feature, the support member being partially positioned below a cooler in the cooling system;
   securing the suspension feature to the motor;
   positioning the motor at a first position; and
   re-positioning the motor at a second position.

13. The method of claim 12, wherein the first position is below the cooler.

14. The method of claim 12, wherein the second position is within a region beyond the cooler.

15. The method of claim 12, wherein the support member extends from below the cooler to a region beyond the cooler.

16. The method of claim 12, wherein the suspension feature includes one or more trolleys positioned within the support member and one or more turnbuckles positioned along one or more cables extending from the support member toward the motor.

17. A motor handling system, comprising:
   a suspension feature configured to engage a support member, the support member positioned partially below a cooler;
   wherein the suspension feature is configured to be secured to a motor;
   wherein the motor handling system permits positioning of the motor in a first position and re-positioning of the motor to a second position.

18. The motor handling system of claim 17, further comprising a mounting bracket secured to the motor and the suspension feature.

19. The motor handling system of claim 17, wherein the suspension feature includes one or more trolleys positioned within the support member.

20. The motor handling system of claim 17, wherein the suspension feature includes one or more turnbuckles positioned along one or more cables arranged to extend toward the motor.

* * * * *